UNITED STATES PATENT OFFICE.

JOKICHI TAKAMINE, OF CHICAGO, ILLINOIS.

MEANS FOR AND METHOD OF CONVERTING STARCHY MATERIAL INTO SUGAR.

SPECIFICATION forming part of Letters Patent No. 525,971, dated September 11, 1894.

Application filed March 24, 1892. Serial No. 426,320. (No specimens.)

*To all whom it may concern:*

Be it known that I, JOKICHI TAKAMINE, a subject of the Emperor of Japan, residing at Chicago, in the county of Cook and State of Illinois, have invented new and useful Improvements in Means for and Methods of Converting Starchy Material into Sugar, of which the following is a specification.

My invention relates to new and useful improvements in the method of converting starchy material into sugars or sugar solution.

I have discovered that the comminuted or broken grains of cereals from which the greater portion of starchy material has been removed possess certain constituents, which, when united and mingled in proper proportions with taka-koji or taka-koji-diastase, increase and enlarge the diastatic properties thereof in a very marked degree.

I employ the term taka-koji, to designate a mass of comminuted or broken grains of cereals, upon and throughout which is grown and developed to a certain extent a fungous growth, possessing both diastatic and fermenting properties.

I employ the term taka-koji diastase to designate the solution or extract obtained by dissolving out from taka-koji with water, the diastatic property thereof.

In practice I prefer to employ the comminuted or broken grains of wheat from which the greater part of starchy matter has been removed, as in the case of bran, shorts, or middlings singly or mixed with each other, for I have discovered that each of these possesses the constituents which, united and mingled with taka-koji or taka-koji-diastase, as above described, increase the diastatic properties of the latter very much more than the sum of the diastatic properties of each constituent. This property or substance contained in the comminuted or broken grains of cereals from which the greater part of starchy matter has been removed, may be removed or washed out from a mass thereof by soaking and thoroughly stirring in water and then filtering, or else by percolating water through a mass of said material. By this operation, the water will extract and hold in solution a large percentage of the constituents or substances which, when united and mixed with taka-koji or taka-koji-diastase, increase to an enormous extent the diastatic power contained therein.

As is well known, the materials I prefer to use, namely, wheat brans, shorts, or middlings, contain but a very slight, almost inappreciable diastatic property.

In carrying out my invention, I take a mass of starchy material which has been properly cooked by steaming, or with water or otherwise, and add thereto, as the converting agent, a mixture in equal parts of the mass of comminuted or broken grain, as above described, and taka-koji or of the extract of the said mass and taka-koji-diastase, or an extract obtained from a mixture of about equal portions of said mass and taka-koji.

Ordinarily, in making a conversion about ten per cent. by weight of the converting agent is added to about ninety per cent. by weight of the starchy mass to be converted. In carrying out my invention, I have found that an equally good, if not a better conversion is effected when, instead of using about ten per cent. of taka-koji or taka-koji-diastase alone, as the converting agent, I use a mixture of about five per cent. of taka-koji and about five per cent. of the comminuted mass, as above described, or taka-koji diastase obtainable from about five per cent. of taka-koji and the extract obtained from about five per cent. of the raw material, or the extract obtained from a mixture of about five per cent. of taka-koji and about five per cent. of the raw material, thus effecting, with equally good results, a saving of one half of the taka-koji or taka-koji-diastase at the expense merely of an equal amount or quantity of raw material. I can also make other combinations with the above named converting agents with equally good results as by mixing taka-koji-diastase with the solid raw material, or the extract of the solid raw material with taka-koji, without departing from the spirit or scope of my invention.

In the illustrations above given I have specified certain proportions, but other proportions may be employed if found desirable and they can only be regulated by experience and the character of the raw material, and diastatic substances employed, and I do not desire to limit myself to the specific proportions specified, but my invention consists broadly in the discovery that there exists in and about the comminuted or broken grain of cereals from which the greater part of starchy matter has been removed, certain soluble constituents or properties, which, when mixed with taka-koji or taka-koji-diastase, acquire the power of increasing or enlarging the diastatic properties contained therein, and that a converting agent constituted substantially as and in the proportions above specified effects a more economical, certain and complete conversion of the mass to be converted than when merely the diastatic material alone is used in equal weight as the converting agent.

It is evident that there may be various changes and modifications in the process and operation of my invention, and the proportions of materials used, and I therefore do not intend to limit myself to the exact features set forth.

The properties above described of wheat brans, shorts or middlings, I find can be used also with malt or with koji with similar effect, but not in such a marked or extraordinary degree.

What I claim as my own invention, and desire to secure by Letters Patent of the United States, is—

1. The method of making a conversion of the starchy matter of cereals which consists in cooking the starchy material in water in the usual manner, and then introducing into and mingling with it a mixture or composition that has been thoroughly stirred and commingled, consisting of broken or comminuted grains of cereals from which the more starchy part has been removed and taka-koji in the proportions specified, substantially as and for the purposes set forth.

2. The method of making a conversion of the starchy material of cereals which consists in cooking the starchy material in water, in the usual manner and then introducing into and mingling with it a mixture of the extract of broken or comminuted grains of cereals from which the more starchy matter has been removed, and taka-koji-diastase, in the proportions specified, substantially as and for the purpose set forth.

3. The method of making a conversion of the starchy material of cereals, which consists in cooking the starchy material in water in the usual manner, and then introducing into and mingling with it in the required proportion, an extract obtained from a mixture of comminuted or broken grains of cereals, from which the more starchy part has been removed, and taka-koji, in the proportions specified, substantially as and for the purpose specified.

4. A composition of matter as a converting agent for converting starchy matter into sugar, comprising a mixture in the proportions specified of taka-koji and broken or comminuted grains of cereals from which the more starchy part has been removed; substantially as described.

5. A composition of matter as a converting agent for converting starch into sugar in the form of a liquid comprising a mixture in the proportions specified of an extract from comminuted or broken grains of cereals from which the more starchy part has been removed and taka-koji diastase; substantially as described.

6. A composition of matter as a converting agent for converting starch into sugar, in the form of a liquid comprising an extract from a mixture in the proportions specified of taka-koji and comminuted or broken grains of cereals from which the greater part of starchy matter has been removed; substantially as described.

7. A composition of matter, a converting agent for converting starchy matter into sugar. composed of a mixture, substantially in the proportions specified, of a mass of comminuted or broken grains of cereals from which the more starchy part has been removed, and taka-koji-diastase, as and for the purpose specified.

8. As a composition of matter, a converting agent for converting starchy matter into sugar, composed of a mixture, substantially in the proportions specified, of an extract from broken or comminuted grains of cereals from which the more starchy part has been removed, and taka-koji, as and for the purpose specified.

In testimony whereof I have hereunto set my hand in the presence of two witnesses.

JOKICHI TAKAMINE.

Witnesses:
FRANK T. BROWN,
J. LAWRENCE GERRY.